(12) United States Patent
Oke et al.

(10) Patent No.: US 7,327,427 B2
(45) Date of Patent: Feb. 5, 2008

(54) LIQUID CRYSTAL DISPLAY DEVICE

(75) Inventors: Ryutaro Oke, Mobara (JP); Kikuo Ono, Mobara (JP); Takahiro Ochiai, Chiba (JP)

(73) Assignee: Hitachi Displays, Ltd., Chiba-ken (JP)

( * ) Notice: Subject to any disclaimer, the term of this patent is extended or adjusted under 35 U.S.C. 154(b) by 88 days.

(21) Appl. No.: 10/781,896

(22) Filed: Feb. 20, 2004

(65) Prior Publication Data

US 2004/0174482 A1    Sep. 9, 2004

(30) Foreign Application Priority Data

Mar. 7, 2003   (JP) .............................. 2003-060971

(51) Int. Cl.
*G02F 1/1343* (2006.01)

(52) U.S. Cl. ...................................... 349/141; 349/139

(58) Field of Classification Search ................ 349/141, 349/143, 139, 42–43
See application file for complete search history.

(56) References Cited

U.S. PATENT DOCUMENTS

| | | | |
|---|---|---|---|
| 5,852,485 A | 12/1998 | Shimada et al. | 349/113 |
| 6,724,452 B1 * | 4/2004 | Takeda et al. | 349/139 |
| 6,816,221 B2 * | 11/2004 | Oke et al. | 349/141 |
| 2004/0174482 A1 * | 9/2004 | Oke et al. | 349/139 |

* cited by examiner

*Primary Examiner*—Dung T. Nguyen
(74) *Attorney, Agent, or Firm*—Reed Smith LLP; Stanley P. Fisher, Esq.; Juan Carlos A. Marquez, Esq.

(57) ABSTRACT

In a liquid crystal display device, a counter electrode CT is arranged above and is overlapped to a drain line DL by way of an insulation layer, wherein a width of the counter electrode CT is set larger than a width of the drain line DL, and a recessed groove AL is formed between an end periphery of the counter electrode CT and the drain line DL along the extending direction of the counter electrode CT and the drain line DL.

11 Claims, 12 Drawing Sheets

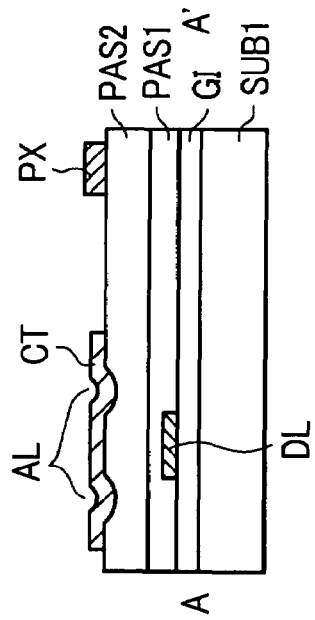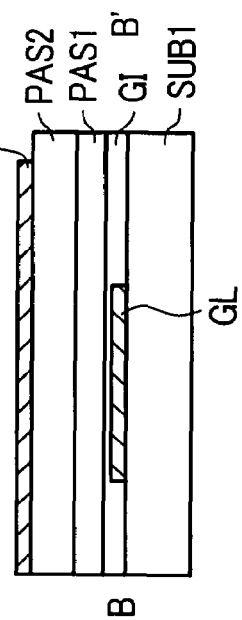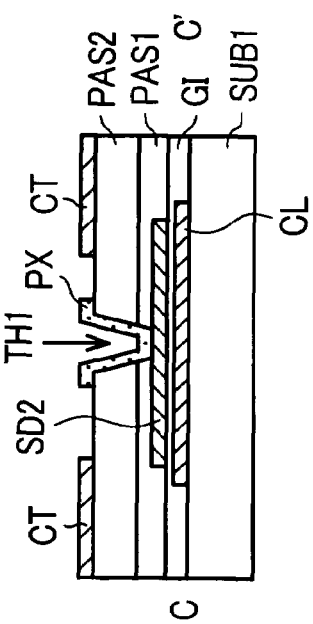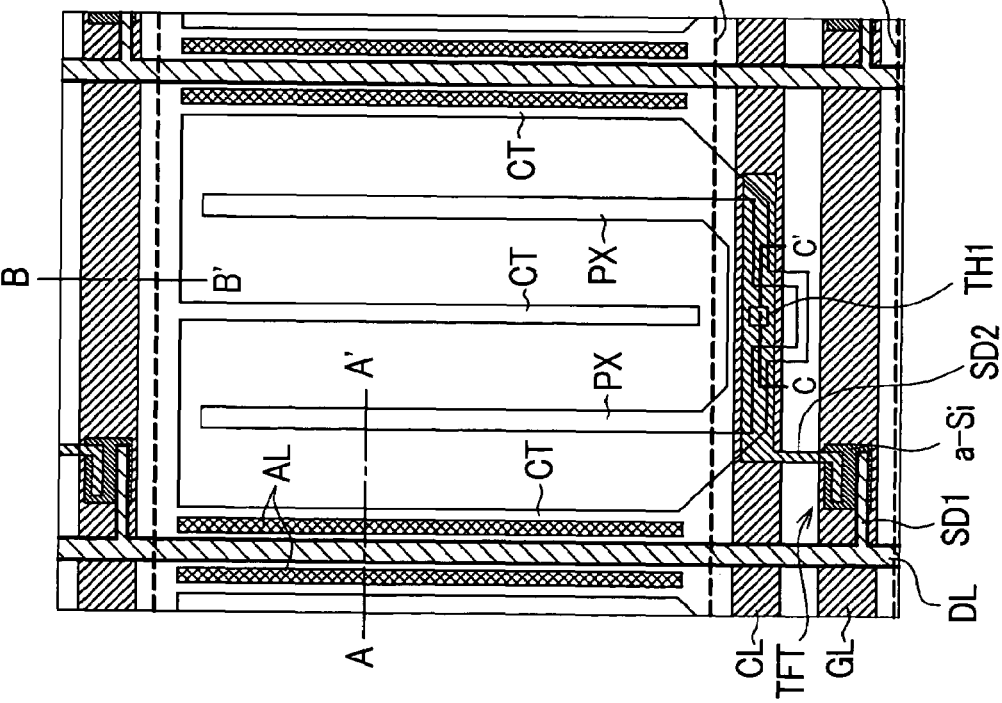

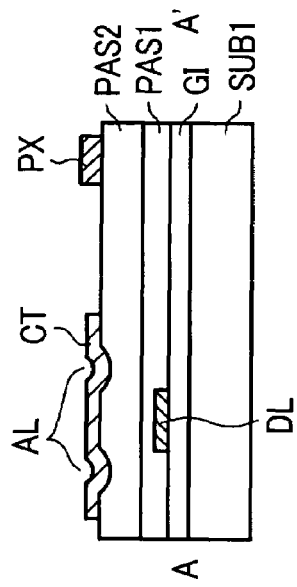
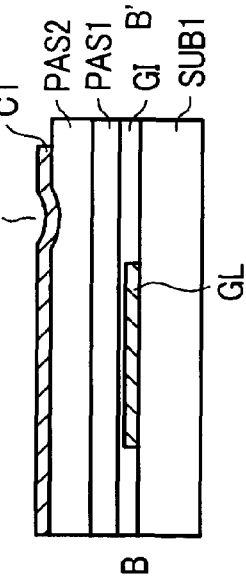
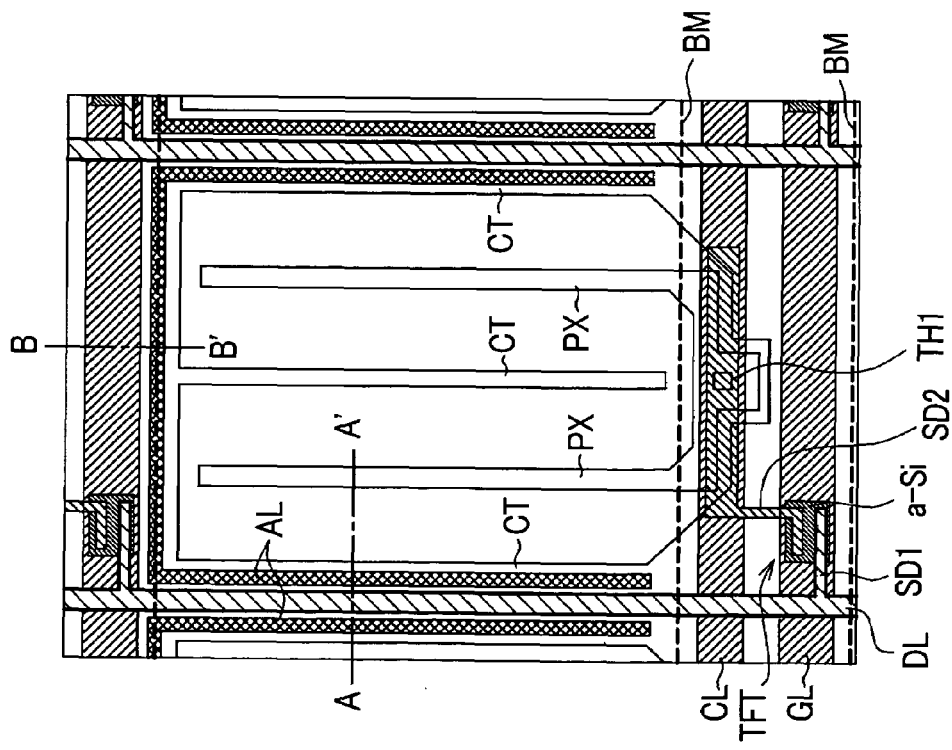

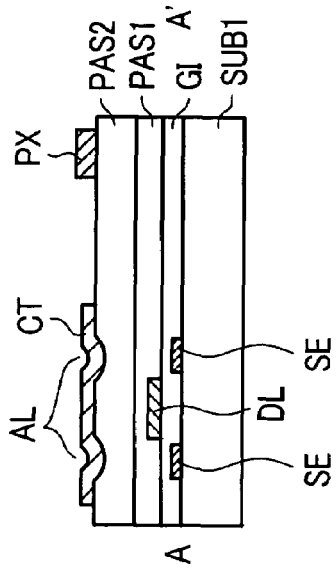
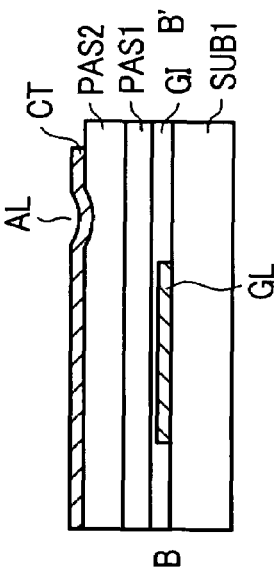
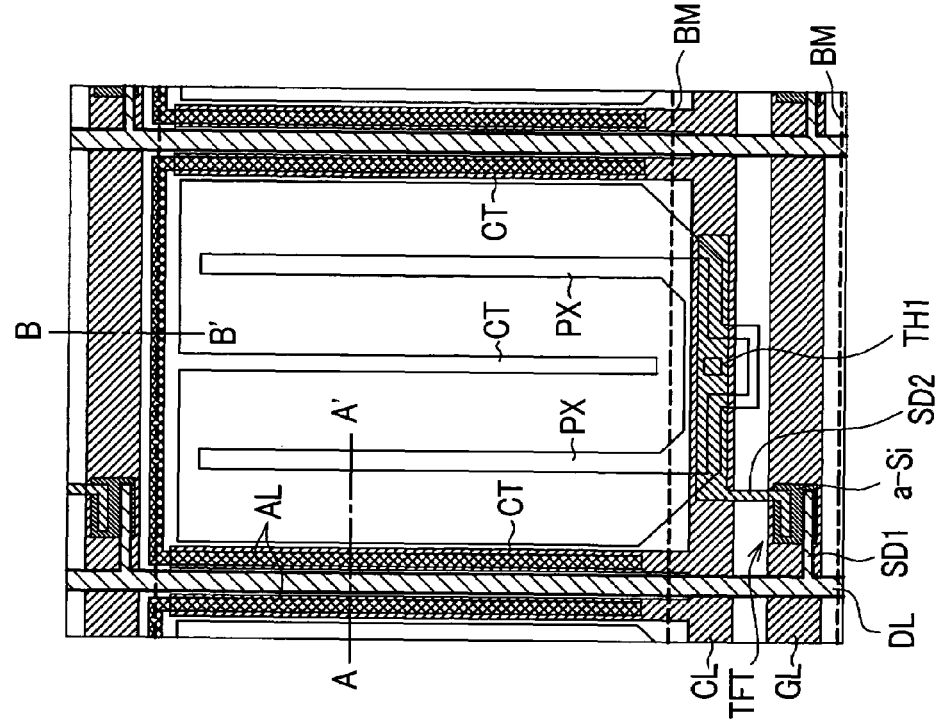

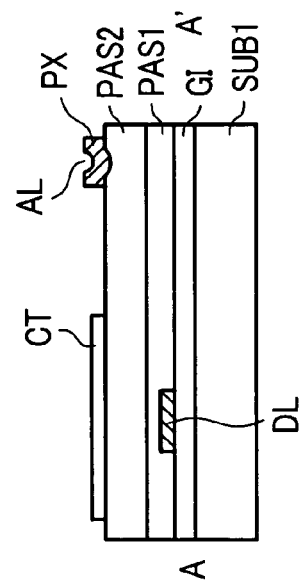
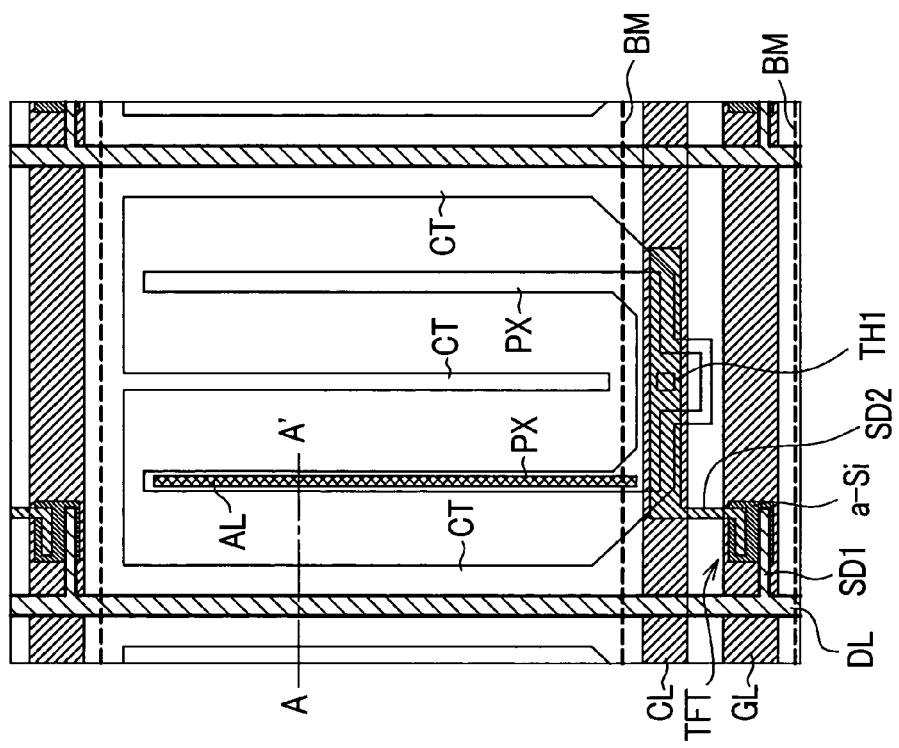

LIQUID CRYSTAL DISPLAY DEVICE

BACKGROUND OF THE INVENTION

1. Field of the Invention

The present invention relates to a display device, and more particularly to an active matrix type liquid crystal display device having a substrate on which switching elements are arranged in a matrix array for respective pixels.

2. Description of the Related Art

An active matrix type liquid crystal display device arranges switching elements which are represented by thin film transistors (also referred to as TFT hereinafter) on an insulation substrate made of glass or the like in a matrix array and displays videos (or images) by selecting respective pixels by the switching elements.

That is, the liquid crystal display device basically adopts a display principle which makes use of a so-called light shutter operation in which one of two substrates is used as an active matrix substrate, a liquid crystal layer is sandwiched between the active matrix substrate and another substrate on which color filters are formed, and a quantity of light which passes through the liquid crystal layer is adjusted by controlling the orientation direction of molecules of the liquid crystal layer by applying electric fields to the liquid crystal layer in response to gray scales of the pixels. Further, as a method which can enlarge a viewing angle of the liquid crystal display device, there has been developed a lateral electric field type (also referred to as IPS) liquid crystal display device in which the direction of an electric field applied to a liquid crystal layer is made substantially parallel to a surface of a substrate.

In the liquid crystal display device adopting the IPS method, TFTs are provided at respective crossing portions where gate lines (also referred to as scanning signal lines) and drain lines (also referred to as data signal lines or video signal lines) cross each other on an active matrix substrate. Further, counter electrodes which face pixel electrodes driven by the TFTs by way of the liquid crystal layer are arranged in parallel on the active matrix substrate, an electric field which is substantially parallel to a surface of the above-mentioned substrate is generated, and the orientation direction of molecules of the liquid crystal layer is controlled by the electric field. As a literature which discloses this type of liquid crystal display device, U.S. Pat. No. 5,852,485 is named, for example.

SUMMARY OF THE INVENTION

However, with respect to this type of liquid crystal display device, wiring on the active matrix substrate is complicated. That is, the counter electrodes and the pixel electrodes are formed in the substantially same direction as the drain lines which are formed on the active matrix substrate, a portion of each counter electrode is overlapped to the drain line, and various electrodes are formed such that these electrodes are overlapped to gate lines, counter electrode lines and the like. Accordingly, leaked electric fields from the drain lines, gate lines, other lines and the electrodes influence potentials of the pixel electrodes, the counter electrodes and the like whereby there exists a possibility that the electric fields applied to the liquid crystal layer are disturbed and the display quality is degraded. Further, since a large number of lines such as the above-mentioned drain lines, gate lines, counter electrodes, the pixel electrodes and the like are formed over the active matrix substrate, the upper-layer electrodes formed of thin films are liable to be easily disconnected.

In U.S. Pat. No. 5,852,485, there has been disclosed the structure in which the convex counter electrodes are formed over the drain lines such that the counter electrodes cover the drain lines by way of an insulation layer and, at the same time, the convex pixel electrodes are formed over the convex insulation layer thus generating an electric field in the direction parallel to the substrate, that is, a lateral electric field between respective convex counter electrodes and the pixels. Due to such a structure, the drain lines are shielded by the counter electrodes and hence, the influence of the leaked electric field from the drain line on the pixel electrodes can be suppressed. However, since the convex electrodes have a convex shape, the disconnection or so-called broken step is liable to be easily generated on the counter electrodes or the pixel electrodes which are formed of a thin film attributed to foreign matters at the time of forming films particularly thus easily giving rise to a defective display.

It is an advantage of the present invention to provide a liquid crystal display device having an active matrix substrate which forms counter electrodes of a shape which has no broken steps over drain lines or the like and blocks a leaked electric field from the drain lines or the like thus suppressing a defective display.

According to one constitutional example which achieves the above-mentioned advantage, the liquid crystal display device includes an active matrix substrate on which a large number of gate lines and a large number of drain lines which cross each other, switching elements which are formed at respective crossing portions of the gate lines and the drain lines in a matrix array, pixel electrodes which are driven by the switching elements and counter electrodes which drive liquid crystal using an electric field generated between the counter electrodes and the pixel electrodes are formed and another substrate which faces the active matrix substrate by way of a liquid crystal layer, wherein the counter electrode is arranged above the drain line and is overlapped to the drain line by way of an insulation layer, the counter electrode has a region having a width larger than a width of the drain line, and the counter electrode has a groove which is recessed along the extending direction of the drain line between an end periphery of the counter electrode and the drain line.

The above-mentioned liquid crystal display device of the present invention may be configured such that the grooves are formed at both sides of the drain line and the counter electrode has a groove which is recessed along the extending direction of the gate line between an end periphery of the counter electrode and the gate line.

Further, the above-mentioned liquid crystal display device of the present invention may be configured such that the liquid crystal display device includes counter electrode lines which are arranged close to the gate lines, the groove is formed at a pixel electrode side with respect to the gate line, and the counter electrode and the counter electrode line are overlapped to each other at a side opposite to the pixel electrode with respect to the gate line.

Further, the above-mentioned liquid crystal display device of the present invention may be configured such that a shielding electrode is disposed below the drain line and is positioned below the groove formed in the counter electrode, and the shielding electrode is connected to the counter electrode line.

According to another constitutional example which achieves the above-mentioned advantage, a liquid crystal display device includes an active matrix substrate on which a large number of gate lines and a large number of drain lines which cross each other, switching elements which are formed at respective crossing portions of the gate lines and the drain lines in a matrix array, pixel electrodes which are driven by the switching elements and counter electrodes which drive liquid crystal using an electric field generated between the counter electrodes and the pixel electrodes are formed, and another substrate which faces the active matrix substrate by way of a liquid crystal layer, wherein grooves which are recessed to a lower layer side are formed in either one or both of the pixel electrode or the counter electrode along the extending direction of the electrodes.

Further, the above-mentioned liquid crystal display device may be configured such that an orientation film is formed on either one or both of the pixel electrode or the counter electrode having the grooves, and a film thickness of the orientation film at a center portion of the groove is set larger than a film thickness of the orientation film at flat end portions of the electrode.

Further, the above-mentioned liquid crystal display device may be configured such that the electrode having the groove is formed by way of an insulation layer formed above the drain electrode, the groove is formed between the drain electrode and the electrode, an orientation film is formed over the electrode, and a film thickness of the orientation film at a center portion of the groove is set larger than a film thickness of the orientation film at end portions of the electrode.

Further, the above-mentioned liquid crystal display device may be configured such that the electrode is a transparent electrode and the liquid crystal display device performs a display in a normally black mode.

By adopting any one of the above-mentioned constitutions of the present invention, a leaked electric field from the drain lines or the like can be blocked, the influence of the leaked electric field from the drain lines or the like on an electric field applied to the liquid crystal layer can be suppressed whereby a display defect such as smears can be prevented. Further, it is no more necessary to form convex portions and hence, it is possible to prevent the disconnection of thin films which constitute the electrodes whereby the liquid crystal display device of high reliability and high quality can be obtained.

BRIEF DESCRIPTION OF THE DRAWINGS

FIGS. 1A, 1B, 1C and 1D are explanatory views of the first embodiment of a liquid crystal display device according to the present invention;

FIGS. 6A, 6B and 6C are explanatory views of another embodiment of the liquid crystal display device according to the present invention;

FIGS. 7A, 7B and 7C are explanatory views of another embodiment of the liquid crystal display device according to the present invention;

FIGS. 8A and 8B are explanatory views of another embodiment of the liquid crystal display device according to the present invention;

DESCRIPTION OF THE PREFERRED EMBODIMENTS

Figure 2:
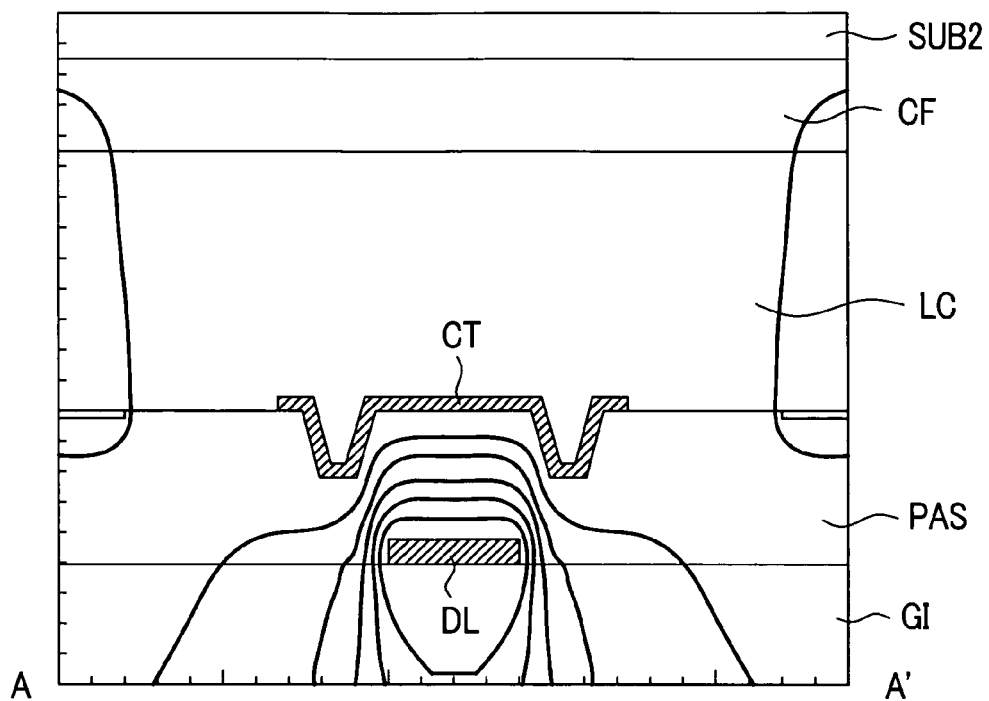
FIG. 2 is an explanatory view of a shielding effect when grooves are formed in a counter electrode.

Embodiments of a liquid crystal display device according to the present invention are explained in detail in conjunction with drawings which show the embodiments hereinafter. FIG. 1(a) to FIG. 1(d) are explanatory views of the first embodiment of a liquid crystal display device according to the present invention, wherein FIG. 1(a) is a plan view of a vicinity of one pixel formed on an active matrix substrate as viewed from a color filter substrate side not shown in the drawing, FIG. 1(b) is a schematic cross-sectional view taken along a line A-A' in FIG. 1(a), FIG. 1(c) is a schematic cross-sectional view taken along a line B-B' in FIG. 1(a), and FIG. 1(d) is a schematic cross-sectional view taken along a line C-C' in FIG. 1(a). With respect to one pixel of the liquid crystal display device, on an insulation substrate SUB1 made of glass or the like, a plurality of gate lines GL, a large number of drain lines DL which cross the gate lines GL, and counter electrode lines CL which are arranged parallel to the gate lines GL are formed. Thin film transistors TFT are formed at crossing portions of the gate lines GL and the drain lines DL. The thin film transistor TFT uses the gate line GL as a gate electrode and a drain electrode SD1 and a source electrode SD2 which extend from the drain line DL are formed over a semiconductor layer a-Si which is formed over the gate electrode. The pixel electrode PX and the counter electrode CT are formed of a transparent conductive film made of ITO or the like.

Black matrixes BM indicated by a dotted line in FIG. 1(a) are formed over the color filter substrate side in this embodiment and are arranged to conceal the gate lines GL and the counter electrode lines CL, wherein openings formed in these black matrixes BM constitute pixel regions. Pixel electrodes PX are arranged in the pixel region such that the pixel electrodes PX are connected to the source electrode SD2 of the thin film transistor TFT via a through hole TH1.

On the other hand, the counter electrode lines CL is formed over the insulation substrate SUB1 as a lowermost layer and is connected to the counter electrodes CT via through holes not shown in the drawings The counter electrodes CT are arranged around each pixel and within the pixel region, wherein the counter electrodes are formed in a fine or narrow electrode shape within the pixel region and have a relatively large width at portions such as the drain line DL, the gate line GL and the counter electrode line CL. Stacking of respective lines and electrodes are constituted by way of a gate insulation layer GI and insulation layers PAS1, PAS2. Respective insulation layers are configured as shown in FIG. 1(b) to FIG. 1(d). The insulation layers PAS1, PAS2 are hereinafter referred to as passivation layers.

In this embodiment, the counter electrode CT arranged above the drain line DL sets a width thereof in the direction of a substrate surface of the insulation substrate SUB1 larger than a width of the drain line DL and, at the same time, the counter electrode CT is arranged above and is overlapped to the drain line DL in parallel along the drain line DL by way of the passivation layers PAS1, PAS2. Further, between end peripheries of the counter electrode CT in the extending direction and the drain line DL, recessed grooves AL are formed at the drain line DL side and along the extending direction of the drain line DL in this embodiment. The recessed grooves AL can be U-shaped as shown in FIG. 1(b) or V-shaped as shown in FIG. 2, and they are so formed that they do not cut through a respective electrode. Although the grooves AL are formed at both sides with respect to the drain line DL, it is possible to obtain a practical advantageous effect of the present invention even when the groove AL is formed at one side.

Figure 3:
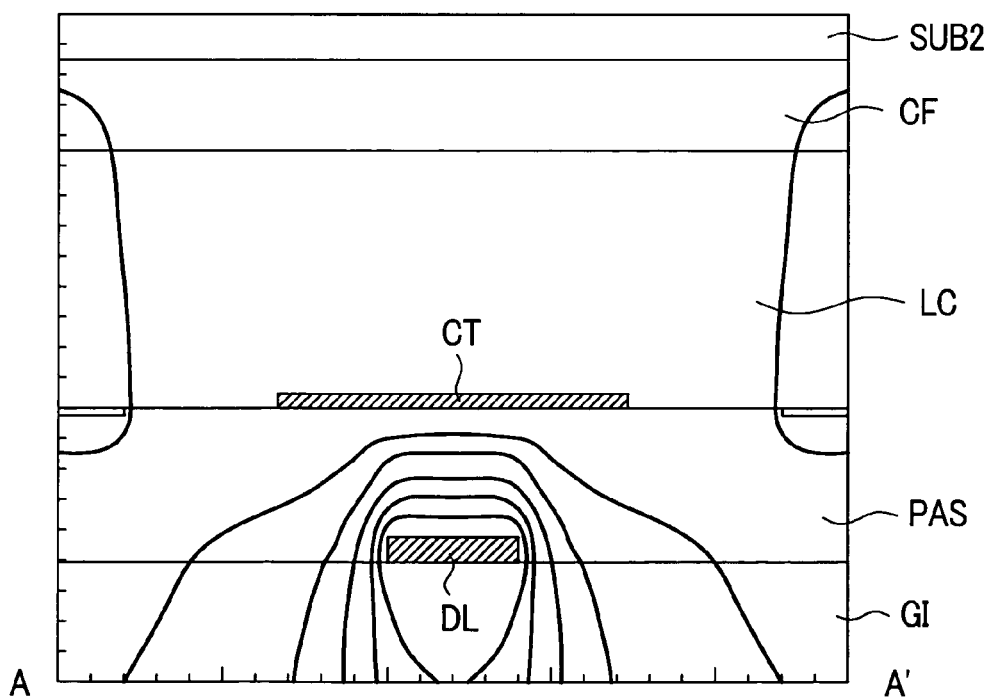
FIG. 3 is an explanatory view of a shielding effect when a counter electrode is held as a flat plate without forming grooves.

FIG. 2 is an explanatory view for explaining a shielding effect when the grooves are formed in the counter electrode CT and FIG. 3 is an explanatory view of a shielding effect when the counter electrode CT maintains a flat plate without forming grooves in the counter electrode CT. AS shown in FIG. 2, when the grooves are formed in the counter electrode, the drain line DL assumes the electric field distribution as illustrated in the drawing, while when the counter electrode CT maintains the flat plate without forming the grooves, the drain line DL assumes the electric field distribution as illustrated in FIG. 3. Here, reference symbol SUB2 in FIG. 2 and FIG. 3 indicates a transparent substrate made of glass or the like which constitutes the color filter substrate, reference symbol CF indicates a color filter, and reference symbol LC indicates a liquid crystal layer. Here, orientation films which are provided to boundaries between the active matrix substrate and the liquid crystal layer LC of the color filter substrate are omitted from the drawings. Further, the passivation layer is indicated as a single layer.

Figure 4:
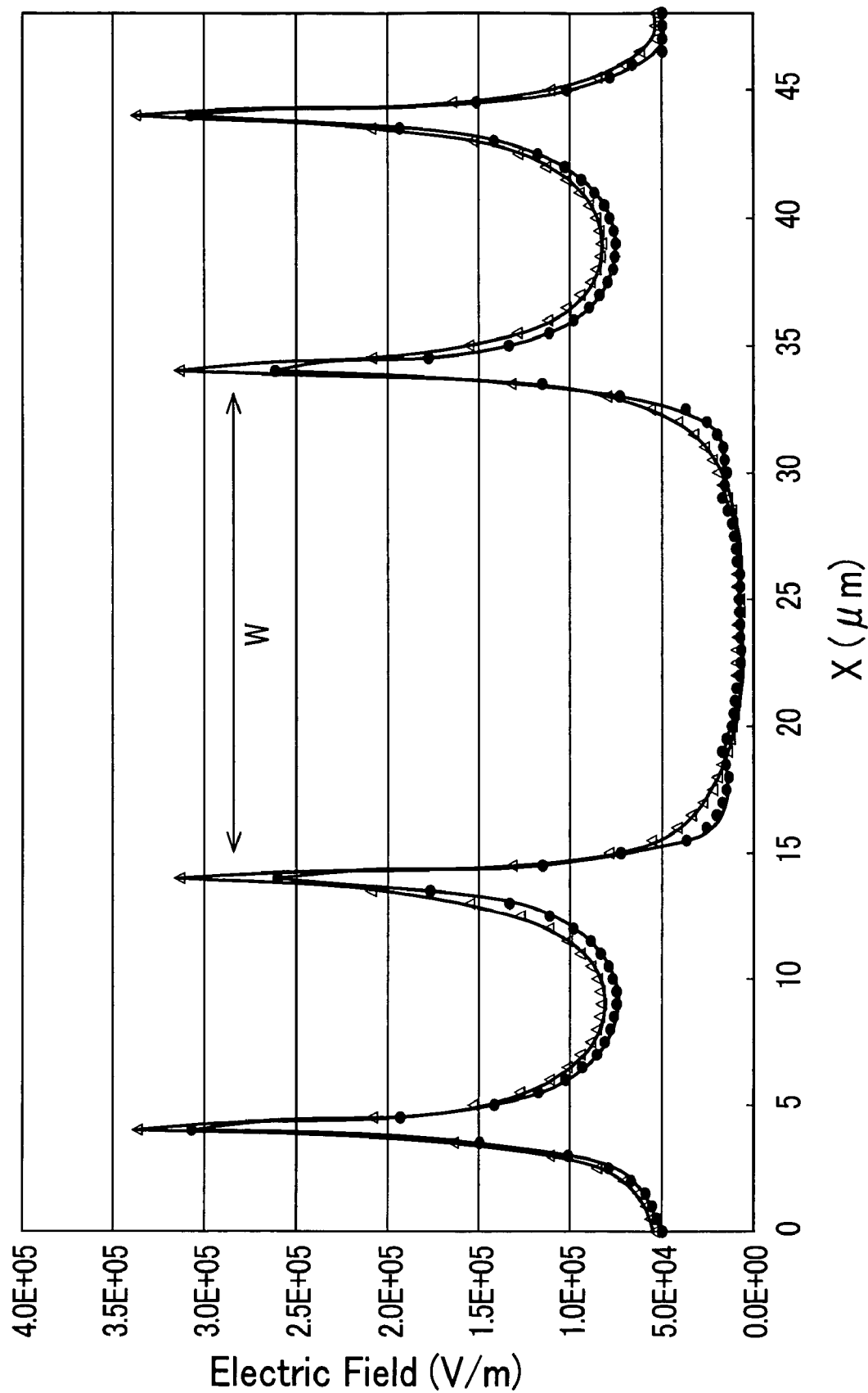
FIG. 4 is an explanatory view of an example of measurement of an electric field strength in the vicinity of the counter electrode when the grooves are formed in the counter electrode and when the counter electrode is held as the flat plate without forming the grooves.

FIG. 4 is an explanatory view of an example of measurement of an electric field strength in the vicinity of the counter electrode when the grooves are formed in the counter electrode and when the counter electrode is held as the flat plate without forming the grooves. In FIG. 4, reference symbol W corresponds to a width of the counter electrode, a curve formed by plotting black dots shows the case in which the grooves are formed in the counter electrode, and a curve formed by plotting white triangles shows the case in which the grooves are not formed in the counter electrode.

Figure 5:
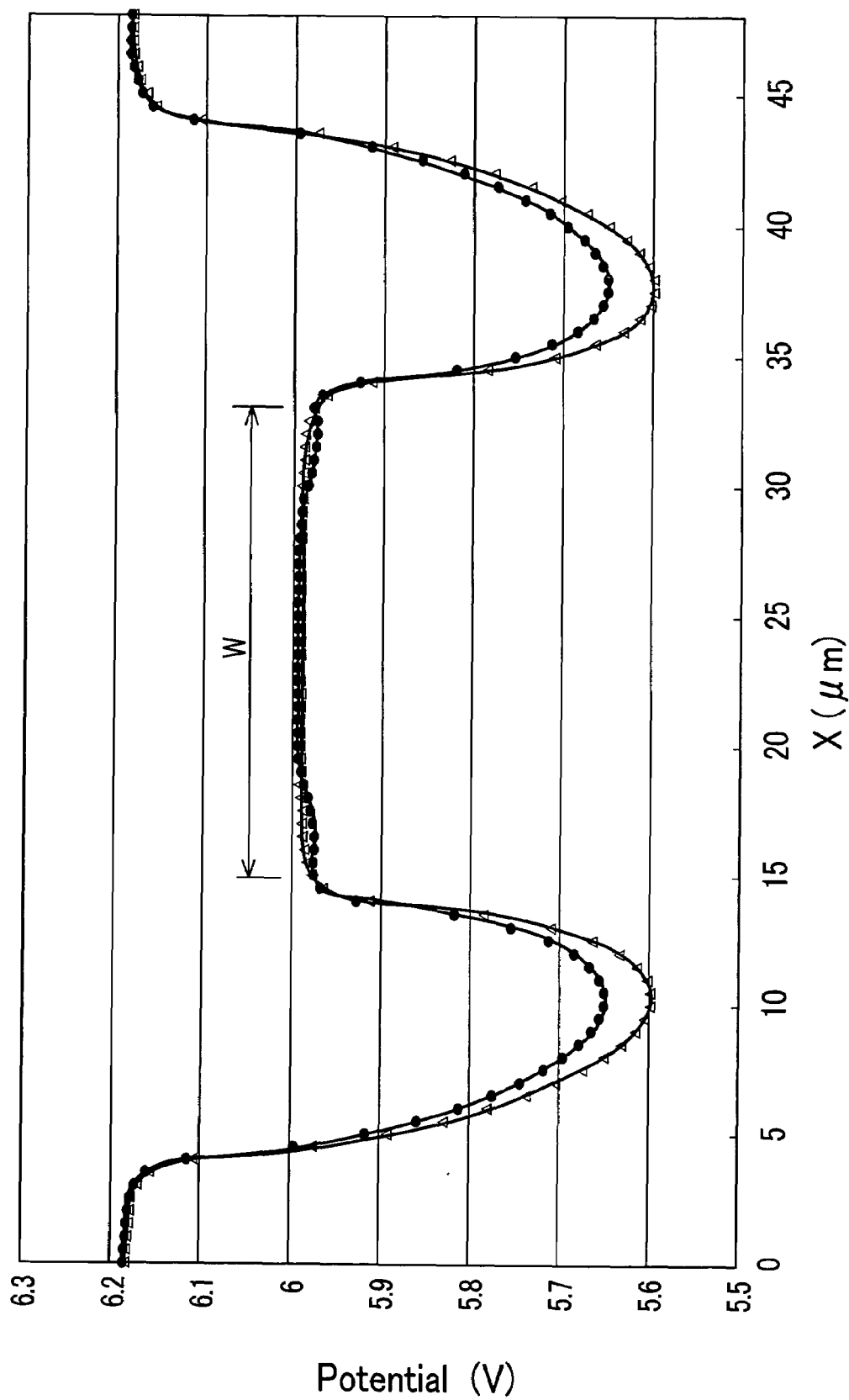
FIG. 5 is an explanatory view of an example of measurement of a potential in the vicinity of the counter electrode when the grooves are formed in the counter electrode and when the counter electrode is held as the flat plate without forming the grooves.

FIG. 5 is an explanatory view of an example of measurement of a potential in the vicinity of the counter electrode when the grooves are formed in the counter electrode and when the counter electrode is held as the flat plate without forming the grooves. In FIG. 5, reference symbol W corresponds to a width of the counter electrode, a curve formed by plotting black dots shows the case in which the grooves are formed in the counter electrode, and the curve formed by plotting white triangles shows the case in which the grooves are not formed in the counter electrode.

As can be understood by comparing the cases shown in FIG. 2 to FIG. 5, by forming the grooves in the counter electrode CT, the electric field generated at an end portion of the drain line DL is lowered downwardly. Accordingly, leaking of the electric field from the drain line DL to the pixel electrode PX can be suppressed.

According to this embodiment, the leaked electric field from the drain line DL can be blocked by the counter electrode CT and by forming the grooves AL in the vicinity of the drain line DL, a substantial distance between the counter electrode CT and the drain line DL can be shortened and hence, with respect to the electric field applied to the liquid crystal layer, it is possible to suppress the influence of the leaked electric field from the drain line DL more effectively than the planar counter electrode. Accordingly, a display defect such as smear can be prevented thus enabling the acquisition of the liquid crystal display device of high reliability and high quality.

FIG. 6(a) to FIG. 6(c) are explanatory views of the second embodiment of the liquid crystal display device according to the present invention, wherein FIG. 6(a) is a plan view of a vicinity of one pixel formed on an active matrix substrate as viewed from a color filter substrate side not shown in the drawing, FIG. 6(b) is a schematic cross-sectional view taken along a line A-A' in FIG. 6(a), and FIG. 6(c) is a schematic cross-sectional view taken along a line B-B' in FIG. 6(a). Reference symbols in these drawings indicate parts substantially identical with parts shown in FIG. 1(a) to FIG. 1(d). In this embodiment, in addition to the constitution shown in FIG. 1, a width of the counter electrode CT formed above the gate line GL in the substrate surface direction of the active matrix substrate SUB1 is set larger than a width of the gate line GL. The counter electrode CT is arranged over and is overlapped to the gate line GL by way of an insulation layer GI and passivation layers PAS1, PAS2 along the drain line DL and parallel to a substrate surface of the active matrix substrate SUB1. Further, between end peripheries of the counter electrode CT in the extending direction and the gate line GL, recessed grooves AL are formed at the gate line GL side and along the extending direction of the gate line GL. In this embodiment, the grooves AL are formed only at the pixel electrode PX side of the gate line GL. Further, a side of the gate line GL opposite to the pixel electrode PX is overlapped to the counter electrode line CL.

According to this embodiment, a leaked electric field from the gate line GL can be also blocked. Here, by making the side of the gate line GL opposite to the pixel electrode PX overlapped to the counter electrode line CL, leaking of the electric field from the drain line DL and the gate line GL can be blocked whereby the liquid crystal display device having high reliability and high quality can be obtained.

FIG. 7(a) to FIG. 7(c) are explanatory views of the third embodiment of the liquid crystal display device according to the present invention, wherein FIG. 7(a) is a plan view of a vicinity of one pixel formed on an active matrix substrate as viewed from a color filter substrate side not shown in the drawing, FIG. 7(b) is a schematic cross-sectional view taken along a line A-A' in FIG. 7(a), and FIG. 7(c) is a schematic cross-sectional view taken along a line B-B' in FIG. 7(a). Reference symbols in these drawings indicate parts substantially identical with parts shown in FIG. 1(a) to FIG. 1(d) and FIG. 6(a) to FIG. 6(c). In this embodiment, in addition to the constitution shown in FIG. 6, a pair of shielding electrodes SE is formed below the drain line DL and along positions below the grooves AL formed in the counter electrode CT. Further, these shielding electrodes SE are connected to a common electrode line CL.

According to this embodiment, counter electrode potential surfaces are formed in these grooves AL and hence, a leaked electric field from the drain line DL can be more favorably blocked whereby it is possible to acquire the liquid crystal display device of high reliability and high quality.

FIG. 8(a) and FIG. 8(b) are explanatory views of the fourth embodiment of the liquid crystal display device according to the present invention, wherein FIG. 8(a) is a plan view of a vicinity of one pixel formed on an active matrix substrate as viewed from a color filter substrate side not shown in the drawing and FIG. 8(b) is a schematic cross-sectional view taken along a line A-A' in FIG. 8(a). Reference symbols in these drawings indicate parts substantially identical with parts shown in FIG. 1(a) to FIG. 1(d), FIG. 6(a) to FIG. 6(c) and FIG. 7(a) to FIG. 7(c). In this embodiment, the groove AL is formed in the pixel electrode PX. Although the groove AL is formed only one of two pixel electrodes PX shown in the drawing in FIG. 8, the substantially equal grooves AL may be formed in both of two pixel electrodes (all pixel electrodes when the number of pixel electrodes PX is three or more).

The pixel electrode PX is a fine or narrow electrode and has a small contact area with the passivation layer PAS2 disposed below the pixel electrode PX and hence, the pixel electrode PX is liable to be easily peeled off during manufacturing steps and this has been one of causes which lower a yield rate. By forming the groove AL in such a fine or narrow pixel electrode PX, the contact area of the pixel electrode PX with the passivation layer PAS2 disposed below the pixel electrode PX can be increased and hence, the peel-off of the pixel electrode PX can be suppressed whereby the yield rate can be enhanced. Other advantageous effects obtained by this embodiment are substantially equal to the advantageous effects obtained by the above-mentioned respective embodiments.

Figure 9:
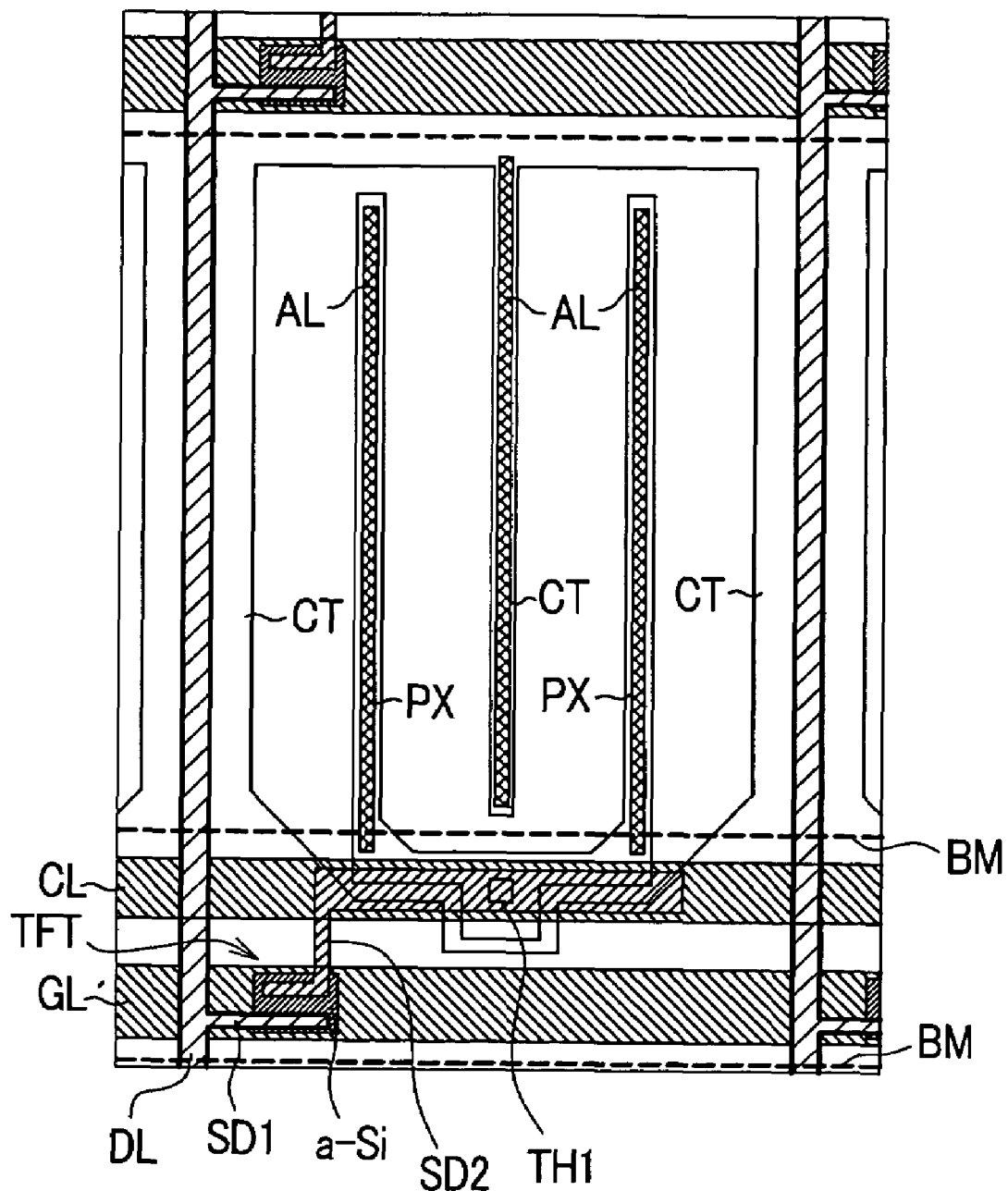
FIG. 9 is an explanatory view of another embodiment of the liquid crystal display device according to the present invention.

FIG. 9 is an explanatory view of the fifth embodiment of the liquid crystal display device according to the present invention. In the drawing, parts having identical functions as the parts of the respective embodiments are given same reference symbols. In this embodiment, the grooves AL are formed also in pixel electrodes PX as well as in the counter electrodes CT arranged in the inside of pixel which are formed of a thin electrode in the same manner as the pixel electrodes PX. Other advantageous effects obtained by this embodiment are substantially equal to the advantageous effects obtained by the fourth embodiment.

Figure 10:
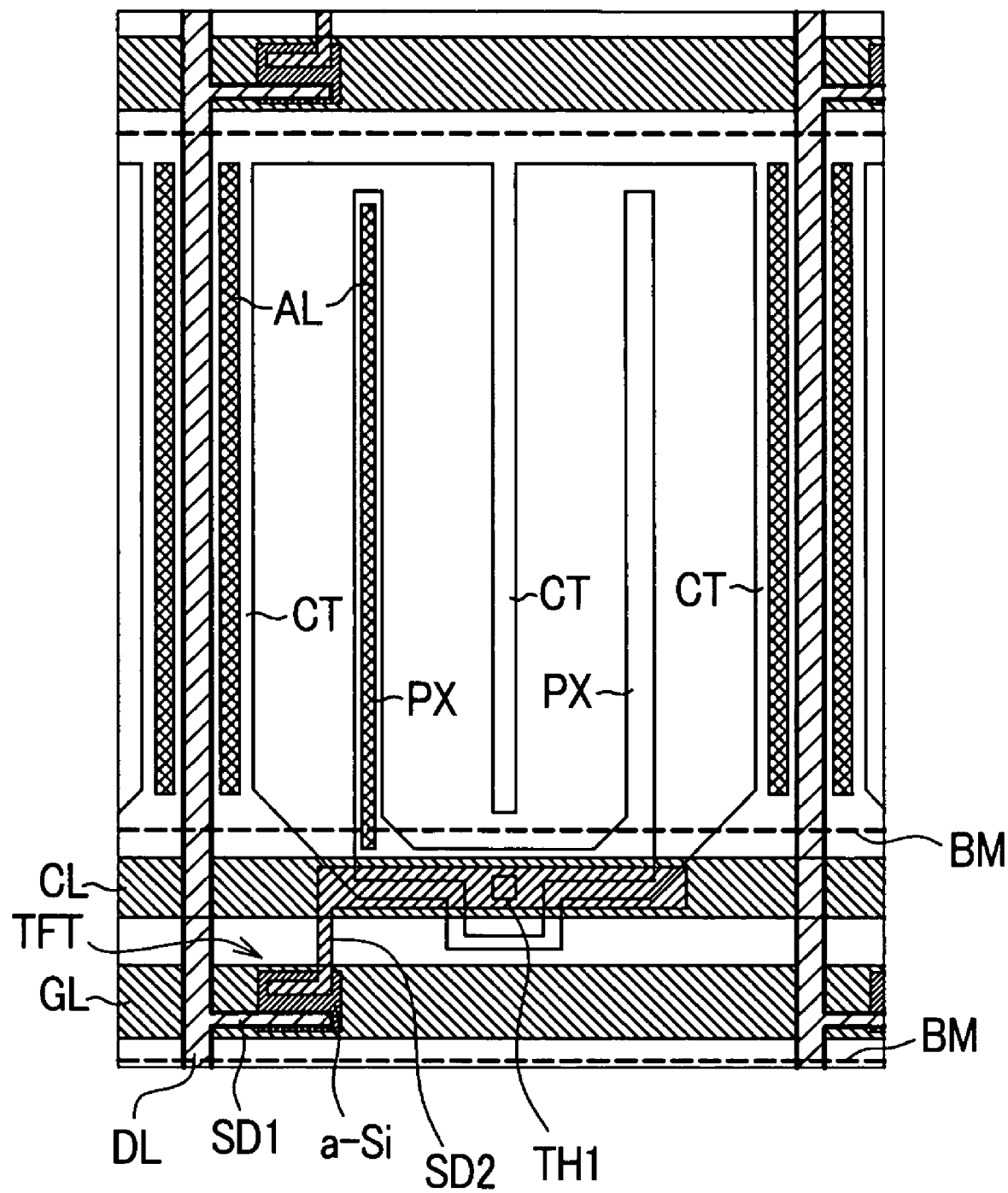
FIG. 10 is an explanatory view of another embodiment of the liquid crystal display device according to the present invention.

FIG. 10 is an explanatory view of the sixth embodiment of the liquid crystal display device according to the present invention. In the drawing, parts having identical functions as the parts of the respective embodiments are given same reference symbols. In this embodiment, grooves AL similar to the grooves AL shown in FIG. 1 are also formed in the counter electrodes CT which are arranged close to the pixel electrode PX and the drain lines DL. Here, although the groove AL is formed in only one of two pixel electrodes PX shown in the drawing in FIG. 10, it is also possible to form the substantially equal grooves AL in both of the pixel electrodes PX (all pixel electrodes PX when the number of pixel electrodes PX is three or more). Advantageous effects obtained by this embodiment are substantially equal to the advantageous effects obtained by the embodiment 1, the embodiment 4 and the embodiment 5. Further, it is possible to combine the constitution of this embodiment with the constitution shown in FIG. 8 to FIG. 10.

Figure 11A:
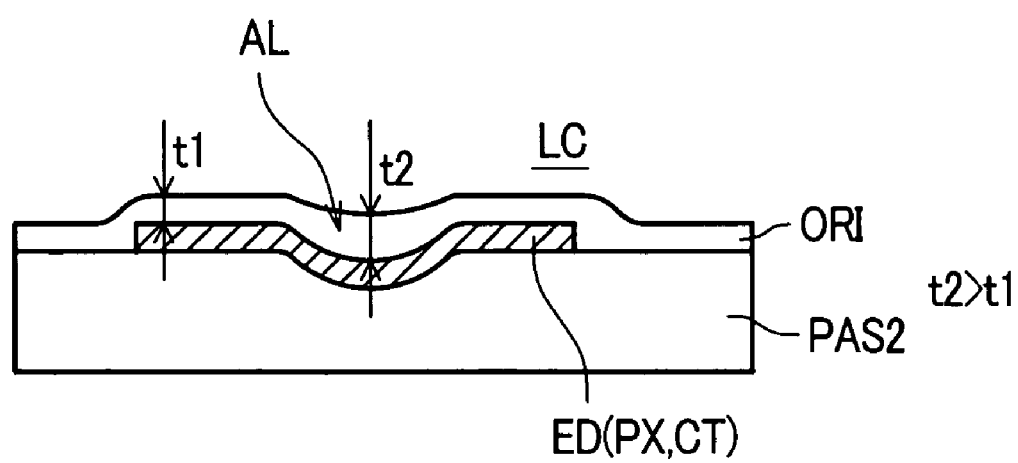
FIGS. 11A and 11B are schematic views for explaining another embodiment of the liquid crystal display device according to the present invention.
Figure 11B:
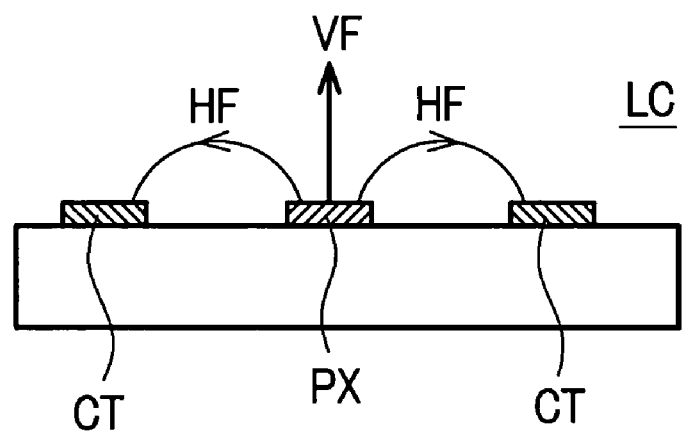

FIG. 11(a) and FIG. 11(b) are schematic views for explaining the seventh embodiment of the liquid crystal display device according to the present invention, wherein FIG. 11(a) shows an electrode ED formed on a passivation layer PAS and an orientation film ORI formed on the electrode ED. Here, the electrode ED is either one of the pixel electrode PX and the counter electrode CT in the above-mentioned embodiments. Further, FIG. 11(b) is an explanatory view of an electric field which is formed between the pixel electrode PX and the counter electrode CT in the pixel region. A liquid crystal layer LC is brought into contact with the orientation film ORI. The orientation film ORI is formed by coating of a resin material which is a dielectric. With respect to a film thickness of the orientation film ORI which is formed by covering the electrode ED (PX, CT) explained in the respective embodiments of the present invention, the thickness is large (film thickness: t2) at a center portion of the electrode ED (PX, CT) where a groove AL is formed and is small (film thickness: t1) at flat portions of the electrode ED (PX, CT) where the groove AL is not present.

In the liquid crystal display device adopting the IPS method, the orientation of molecules of the liquid crystal layer is controlled by forming an electric field parallel to or substantially parallel to a substrate surface of an active matrix substrate. As shown in FIG. 11(b), when one electrode ED is the pixel electrode PX and another electrode ED is constituted of the counter electrodes CT which are arranged at both sides of the pixel electrode PX, an electric field HF in the lateral direction is formed between the pixel electrode PX and the counter electrode CT which are arranged close to each other and a display operation of the IPS method is realized by applying the electric field HF to the liquid crystal layer LC. However, at the center portion of the pixel electrode PX, an electric field VF in the longitudinal direction is generated. The electric field VF in the longitudinal direction induces the disturbance of the electric field HF in the lateral direction. The disturbance of the electric field HF in the lateral direction becomes a cause of leaking of light thus lowering a contrast ratio.

By forming the groove AL in the pixel electrode PX as shown in FIG. 11(a), a loss is generated in the electric field VF in the longitudinal direction due to the orientation film ORI formed of the dielectric. Accordingly, the electric field loss in the vicinity of the groove where a film thickness of the orientation film ORI is large is large and is small at the flat portions. Accordingly, in this embodiment, the intensity of the electric field VF in the longitudinal direction which induces the disturbance of the electric field HF in the lateral direction is decreased whereby the leaking of light is decreased and hence, lowering of the contrast ratio is decreased.

Further, as the eighth embodiment of the present invention, the electrode ED having the groove is used as the counter electrode CT which is formed above the drain electrode DL by way of the insulation layer and the groove AL is formed between the electrode end of the drain electrode DL and the electrode end of the counter electrode CT at the pixel electrode PX side whereby it is possible to obtain the similar advantageous effects as the structure shown in FIG. 11(b).

By forming the pixel electrode PX and the counter electrode CT in the seventh embodiment and the eighth embodiment using the transparent conductive film such as ITO, it is possible to obtain the liquid crystal display in a normally black mode. Here, by adopting the constitution of the seventh embodiment and/or the eighth embodiment, the contrast ratio lowering effect attributed to the suppression of the leaking of light becomes apparent.

Figure 12:
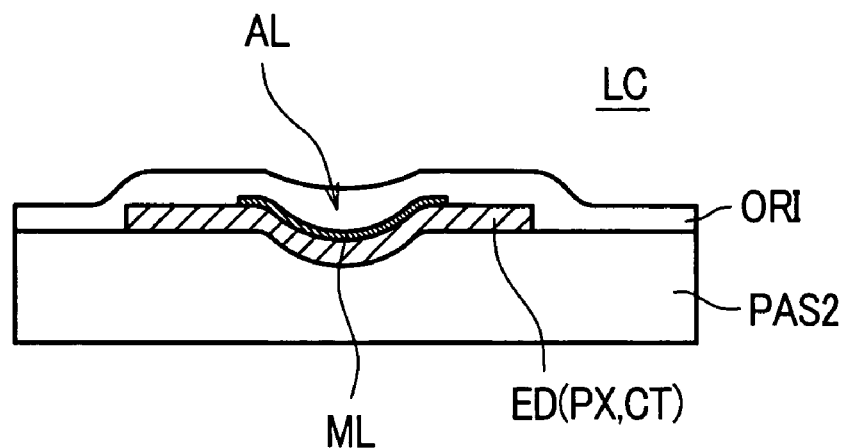
FIG. 12 is a schematic view for explaining another embodiment of the liquid crystal display device according to the present invention.

FIG. 12 is a schematic view for explaining the ninth embodiment of the liquid crystal display device according to the present invention. In this embodiment, a metal layer ML is stacked on a portion of the groove AL formed in the electrode ED as explained in the above-mentioned FIG. 11 and the orientation film ORI is formed over the metal layer ML. According to this embodiment, the above-mentioned leaking of light attributed to the electric field in the longitudinal direction at the groove portion, that is, the center portion of the electrode ED can be directly blocked and hence, the contrast ratio can be further enhanced.

Figure 13:
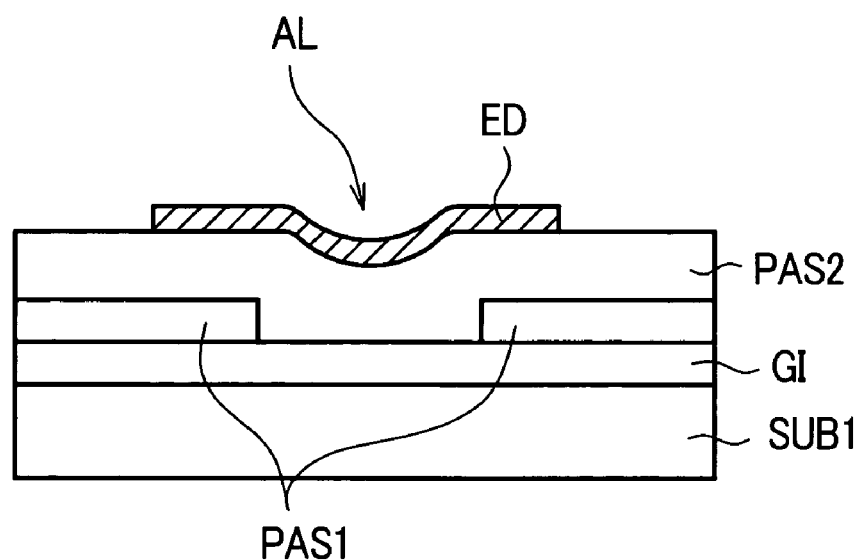
FIG. 13 is a schematic view for explaining one of methods for forming grooves in the electrodes.

FIG. 13 is a schematic view for explaining one of methods for forming the groove in the electrode. As shown in FIG. 13, for example, a portion of the passivation layer PAS1 which is arranged below the passivation layer PAS2 and corresponds to the above-mentioned groove forming portion is removed and, thereafter, the passivation layer PAS2 is formed whereby the groove is formed in the portion which defines the groove AL of the electrode formed on the passivation layer PAS2. The electrode is formed over such a portion and the electrode having the above-mentioned groove AL is obtained by patterning.

Further, as another method for forming the above-mentioned groove AL in the passivation layer PAS2, at the time of performing exposure after applying a resist, a portion to be formed into the groove AL of the electrode formed on the passivation layer PAS is subjected to half exposure. Thereafter, the etching is performed so as to remove the passivation layer PAS at the half-exposed portion more than the passivation layer PAS at the peripheral portion whereby the groove is formed in the passivation layer PAS. Then, the electrode is formed on the passivation layer PAS as a film and is patterned so that the electrode having the above-mentioned groove AL can be obtained.

Figure 14:
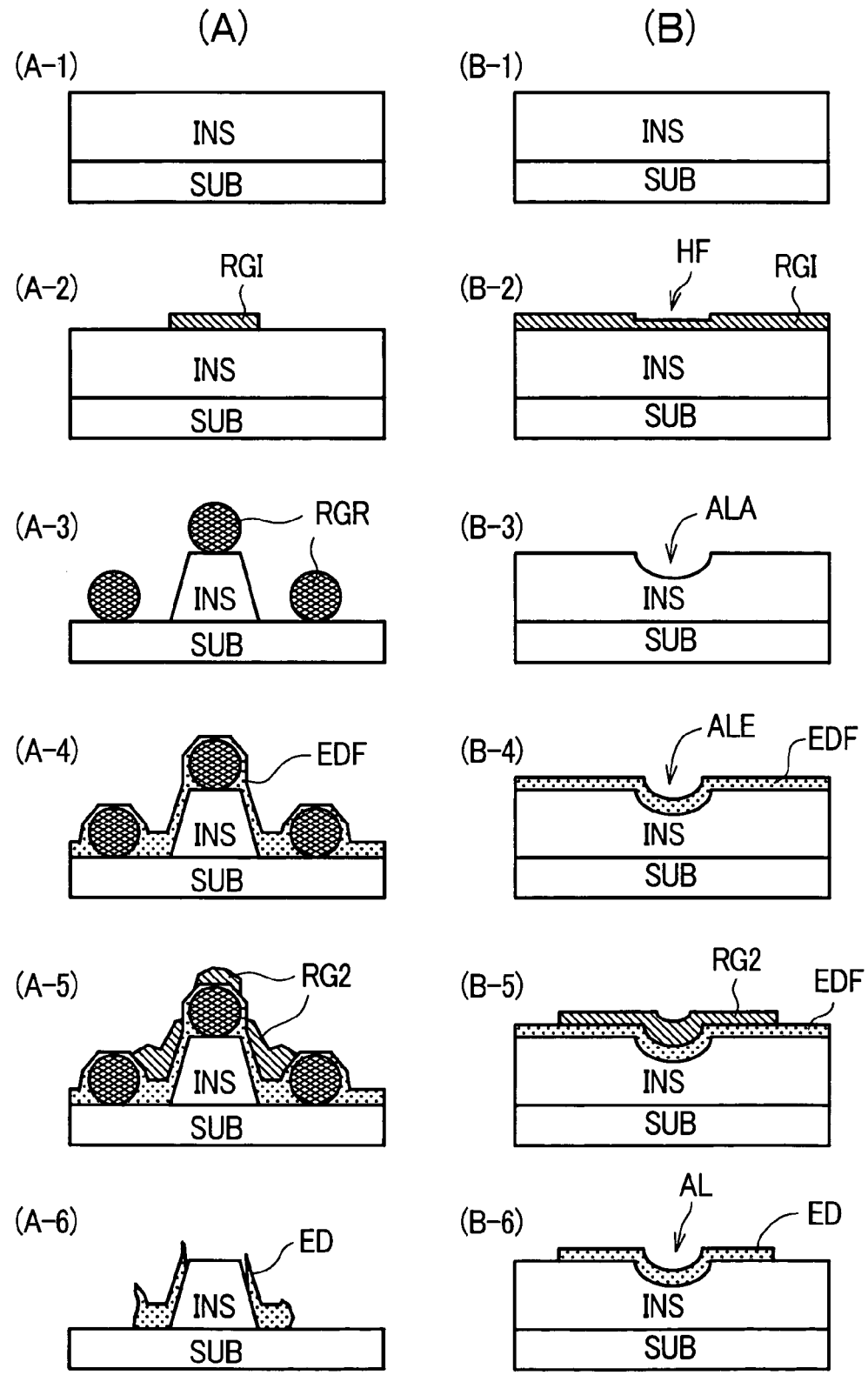
FIGS. 14(A-1), 14(A-2), 14(A-3), 14(A-4), 14(A-5), 14(A-6), 14(B-1), 14(B-2), 14(B-3), 14(B-4), 14(B-5) and 14(B-6) are explanatory views for comparing an advantageous effect obtained by the case in which the grooves are formed in the electrode according to the present invention and the prior art.

FIG. 14(A) and FIG. 14(B) are explanatory views which compare the advantageous effects obtained when the groove is formed in the electrode according to the present invention and the related art for forming the convex pixel electrode on the convex insulation layer as disclosed in "patent literature 1". FIG. 14(A) shows an electrode forming process of the related art and FIG. 14(B) shows an electrode forming process of the present invention.

First of all, in FIG. 14(A), an insulation layer INS is applied to a substrate SUB (A-1). A resist is applied to the insulation layer INS and, thereafter, the resist is exposed in a given pattern using a mask and is developed thus forming a resist pattern RG1 (A-2). Then, the etching treatment is performed so as to pattern the insulation layer INS in a convex shape (A-3). In performing the etching treatment of the insulation layer INS in the convex shape, since an etching amount of the insulation layer INS is large, residues RGR of the resist are frequently generated. A conductive film EDF which becomes the electrode ED is formed over the residues RGR as a film (A-4) and a resist RG2 for patterning the electrodes is applied to the conductive film EDF. Here, steep stepped portions are formed on the conductive film EDF which becomes the electrode due to the presence of the resist residues RGR and hence, the resist RG2 cannot be normally applied thus forming portions where the conductive film EDF is exposed. Thereafter, the conductive film EDF is exposed in an electrode pattern and is developed using a mask (A-5). The electrode pattern is subjected to the etching treatment thus forming the electrode ED (A-6).

However, since an etchant infiltrates into a portion exposed from the resist RG2, the portion falls in a broken-step state or a large number of apertures are formed even when the disconnection is obviated. Accordingly, the electrode is formed on the counter electrode CT formed above the drain line DL and an undesired electric field leaks thus lowering a shielding effect. Further, since an electric field is not generated in the apertured portion, the portion exhibits a poor electric field strength whereby a driving voltage is elevated to obtain a given electric field. Further, since such a phenomenon is unevenly generated within a plane of the display region, the in-plane drive voltage becomes at random whereby the in-plane brightness becomes irregular. Accordingly, the coarse screen and the brightness irregularities are induced.

On the other hand, in the process of the present invention shown in FIG. 14(B), first of all, an insulation layer INS is coated over the substrate SUB (B-1). A resist is applied to the insulation layer INS and a portion of the resist which becomes the groove of the electrode ED is subjected to half exposure and is developed thus forming a resist pattern RG1 having a thin portion (B-2). By etching the resist pattern RG1, a groove-like portion ALA is formed at a thin portion of the insulation layer INS (B-3). A conductive film EDF which becomes the electrode ED is formed as a film (B-4). A resist RG2 for patterning the electrode is applied to the conductive film EDF and the resist RG2 is patterned in a desired electrode pattern (B-5). The conductive film EDF is etched using the patterned resist RG2 thus forming the electrode ED having the groove AL (B-6).

According to the electrode forming process of the present invention, at the time of forming the electrode, compared to the conventional process, the generation of the stepped portions in the insulation layer or the conductive film can be reduced and hence, the electrode having the groove can be accurately formed by suppressing the generation of broken steps or apertures.

As has been explained heretofore, according to the present invention, the leaked electric field from the drain line or the like formed on the display region can be effectively blocked and hence, the influence of the leaked electric field from the drain line or the like on the electric field applied to the liquid crystal layer can be suppressed whereby it is possible to provide the liquid crystal display device of high reliability and high quality which can prevent the display defect such as smear or the like.

What is claimed is:

1. A liquid crystal display device comprising:
   an active matrix substrate on which a large number of gate lines and a large number of drain lines which cross each other, switching elements which are formed at respective crossing portions of the gate lines and the drain lines in a matrix array, pixel electrodes which are driven by the switching elements and counter electrodes which drive liquid crystal using an electric field generated between the counter electrodes and the pixel electrodes are formed; and
   another substrate which faces the active matrix substrate by way of a liquid crystal layer, wherein
   each of the counter electrodes is arranged above a respective drain line and is overlapped to the drain line by way of an insulation layer,
   the counter electrode has a region having a width larger than a width of the drain line, and the counter electrode has a groove which is recessed along the extending direction of the drain line between an end periphery of the counter electrode and the drain line such that the grooves are formed at both sides of the drain line.

2. A liquid crystal display device according to claim 1, wherein the liquid crystal display device includes a shielding electrode which is disposed below the drain line and is positioned below the groove formed in the counter electrode.

3. A liquid crystal display device according to claim 2, wherein the shielding electrode is connected to the counter electrode line.

4. A liquid crystal display device according to claim 1, wherein the liquid crystal display device includes a shielding electrode which is disposed below the drain line and is positioned below the groove formed in the counter electrode.

5. A liquid crystal display device comprising:
an active matrix substrate on which a plurality of gate lines and a plurality of drain lines which cross each other, switching elements which are formed at respective crossing portions of the gate lines and the drain lines in a matrix array, pixel electrodes which are driven by the switching elements and counter electrodes which drive liquid crystal using an electric field generated between the counter electrodes and the pixel electrodes are formed; and
another substrate which faces the active matrix substrate by way of a liquid crystal layer, wherein
at least one of the pixel electrode and the counter electrode has a groove which is recessed along an extending direction of the drain lines, said groove is formed in a central part of the respective electrode without cutting therethrough,
an orientation film is formed on said at least one of the pixel electrode and the counter electrode having the groove, and
a metal layer is formed between the groove and the orientation film.

6. A liquid crystal display device according to claim 5, wherein a film thickness of the orientation film at a center portion of the groove is set larger than a film thickness of the orientation film at flat end portions of the electrode.

7. A liquid crystal display device according to claim 5, wherein the electrode having the groove is formed by way of an insulation layer formed above the drain electrode, the groove is formed between the drain electrode and the electrode, the orientation film is formed over the electrode, and a film thickness of the orientation film at a center portion of the groove is set larger than a film thickness of the orientation film at end portions of the electrode.

8. A liquid crystal display device according to claim 5, wherein the electrode is a transparent electrode and the liquid crystal display device performs a display in a normally black mode.

9. A liquid crystal display device according to claim 5, wherein said groove is shaped concave.

10. A liquid crystal display device according to claim 5, wherein said groove is V-shaped or U-shaped.

11. A liquid crystal display device comprising:
an active matrix substrate on which a large number of gate lines and a large number of drain lines which cross each other, switching elements which are formed at respective crossing portions of the gate lines and the drain lines in a matrix array, pixel electrodes which are driven by the switching elements and counter electrodes which drive liquid crystal using an electric field generated between the counter electrodes and the pixel electrodes are formed; and
another substrate which faces the active matrix substrate by way of a liquid crystal layer, wherein
grooves which are recessed to the side of lower layer are formed in either one or both of the pixel electrode and the counter electrode in each of the crossing portions along the extending direction of the electrodes,
the electrode is a transparent electrode and the liquid crystal display device performs a display in a normally black mode, and
a metal layer is formed between the grooves and the orientation film.

* * * * *